United States Patent
Mamiya et al.

(10) Patent No.: US 6,681,739 B2
(45) Date of Patent: Jan. 27, 2004

(54) CONTROL DEVICE FOR DIRECT-INJECTION SPARK-IGNITION ENGINE AND METHOD OF SETTING FUEL INJECTION TIMING OF THE SAME

(75) Inventors: Kiyotaka Mamiya, Fuchu-cho (JP); Masayuki Tetsuno, Fuchu-cho (JP); Takeo Yamauchi, Fuchu-cho (JP); Noriyuki Ohta, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 79 days.

(21) Appl. No.: 10/145,999

(22) Filed: May 15, 2002

(65) Prior Publication Data

US 2002/0189582 A1 Dec. 19, 2002

(30) Foreign Application Priority Data

May 16, 2001 (JP) ........................................ 2001-147020

(51) Int. Cl.[7] ................................................ F02B 17/00
(52) U.S. Cl. .......................... 123/295; 123/301; 123/305
(58) Field of Search ................................ 123/295, 305, 123/301, 501, 502

(56) References Cited

U.S. PATENT DOCUMENTS 5,749,334 A * 5/1998 Oda et al. .................. 123/305
6,244,243 B1 6/2001 Mamiya et al.
6,484,690 B2 * 11/2002 Tokuyasu et al. ........... 123/301
2002/0134346 A1 * 9/2002 Yamauchi et al. .......... 123/295

FOREIGN PATENT DOCUMENTS

JP 2000-104550 4/2000

* cited by examiner

*Primary Examiner*—Henry C. Yuen
*Assistant Examiner*—Arnold Castro
(74) *Attorney, Agent, or Firm*—Brooks Kushman P.C.

(57) ABSTRACT

A direct-injection spark-ignition engine in which a combustible mixture is produced around a spark plug at an ignition point by causing a tumble and a fuel spray to collide with each other in a combustion chamber during stratified charge combustion comprises a fuel pressure controller which controls fuel pressure such that penetration of the fuel spray from a fuel injector is progressively intensified with an increase in engine speed in a stratified charge combustion region and means for controlling fuel injection timing including an injection timing setter. The means for controlling fuel injection timing controls the injection timing in such a way that the interval between a fuel injection ending point and the ignition point becomes progressively shorter as engine speed increases under the same engine load conditions in the stratified charge combustion region.

10 Claims, 8 Drawing Sheets

CONTROL DEVICE FOR DIRECT-INJECTION SPARK-IGNITION ENGINE AND METHOD OF SETTING FUEL INJECTION TIMING OF THE SAME

BACKGROUND OF THE INVENTION AND RELATED ART STATEMENT

The present invention relates generally to a direct-injection spark-ignition engine having an injector for injecting fuel directly into a combustion chamber, in which a stratified combustible mixture is produced around a spark plug using a tumble during operation by stratified charge combustion. More particularly, the invention pertains to a control device for controlling fuel injection and other factors of such a direct-injection spark-ignition engine as well as to a method of setting fuel injection timing of the same.

In one example of a conventionally known direct-injection spark-ignition engine provided with an injector for injecting fuel directly into a combustion chamber, the air-fuel ratio is increased to produce a lean mixture and the injector injects the fuel during every compression stroke such that the mixture is locally distributed around a spark plug to cause stratified charge combustion in a low-speed low-load operating range, thereby achieving an improvement in fuel economy.

An example of a conventional direct-injection spark-ignition engine is disclosed in Japanese Unexamined Patent Publication No. 2000-104550, in which an intake port is so constructed as to produce a tumble in a combustion chamber and an injector is provided for injecting fuel directly into the combustion chamber. In this construction, the injector injects the fuel in a direction against the tumble in a latter part of the compression stroke during stratified charge combustion so that a fuel spray from the injector hitting against the tumble is carried to an area around a spark plug.

In the direct-injection spark-ignition engine thus constructed, fuel injection time and ignition point during stratified charge combustion are controlled as described in Japanese Unexamined Patent Publication No. 2000-205006, for example. Specifically, the fuel injection time is determined from a predefined "map" according to target load and engine speed while the ignition point is calculated from basic ignition point determined from a predefined "map" according to the target load and the engine speed and various correction values determined according to cooling water temperature and other parameters.

When the fuel injection time during the stratified charge combustion is controlled according to the target load and engine speed as stated above, an arrangement is made to ensure that the period of time from the ending point of fuel injection to the ignition point would not decrease. This is normally achieved by advancing the fuel injection time to increase the difference in crank angle between the fuel injection ending point and the ignition point.

A conventional direct-injection spark-ignition engine using the tumble like the one shown in Japanese Unexamined Patent Publication No. 2000-104550 has a problem that it is difficult to maintain a good stratified charge combustion state over wide engine speed ranges from low-speed to high-speed ranges.

Basically, the higher the engine speed, the higher the velocity of intake air stream, so that a tumble produced by the intake air stream flowing through an intake port into a combustion chamber is intensified as the engine speed increases. Therefore, if penetration of the fuel spray from the injector is constant, the fuel spray tends to be brought to peripheral regions of the combustion chamber in higher speed ranges by tumble flow which becomes more forceful with an increase in the engine speed, even if the engine is designed to properly produce a stratified charge. One approach to the solution of this problem would be to increase the fuel spray penetration to a level corresponding to the intensity of the tumble flow with an increase in the engine speed by increasing the pressure of the fuel supplied to the injector, for example.

Even if the fuel spray penetration is balanced with the intensity of the tumble flow in accordance with the increase in the engine speed in this fashion, however, there arises another problem that the fuel tends to be dispersed in higher engine speed ranges as a result of an increase in hydraulic impact energy.

SUMMARY OF THE INVENTION

In the light of the aforementioned problems of the prior art, it is an object of the invention to provide a control device and a method of setting fuel injection timing for a direct-injection spark-ignition engine in which a stratified combustible mixture is produced using a tumble. It is a more specific object of the invention to provide a control device and a fuel injection timing setting method which make it possible to improve fuel economy of a direct-injection spark-ignition engine by causing the engine to make stratified charge combustion in a preferable fashion in stratified charge combustion regions over wide engine speed ranges from low-speed to high-speed ranges.

To achieve this object, a control device of the invention for a direct-injection spark-ignition engine having a tumble generator for creating a tumble in a combustion chamber and a fuel injector which injects fuel into the combustion chamber in a direction opposite to tumble flow such that a combustible mixture is produced around a spark plug at an ignition point in a stratified charge combustion region which is a low-speed low-load operating range of the engine comprises a penetration adjuster for regulating penetration of a fuel spray from the injector in such a manner that it is progressively intensified with an increase in engine speed in the stratified charge combustion region, and a fuel injection controller for controlling fuel injection timing of the injector according to engine operating conditions, wherein the fuel injection controller causes the injector to inject the fuel before the ignition point on compression stroke in the stratified charge combustion region and controls the injection timing such that the interval between a fuel injection ending point and the ignition point becomes shorter with an increase in the engine speed under the same engine load within the stratified charge combustion region.

These and other objects, features and advantages of the invention will become more apparent from the following detailed description when read in conjunction with the accompanying drawings.

DETAILED DESCRIPTION OF THE PREFERRED EMBODIMENTS OF THE INVENTION

The invention is now described, by way of example, with reference to the accompanying drawings.

Figure 1:
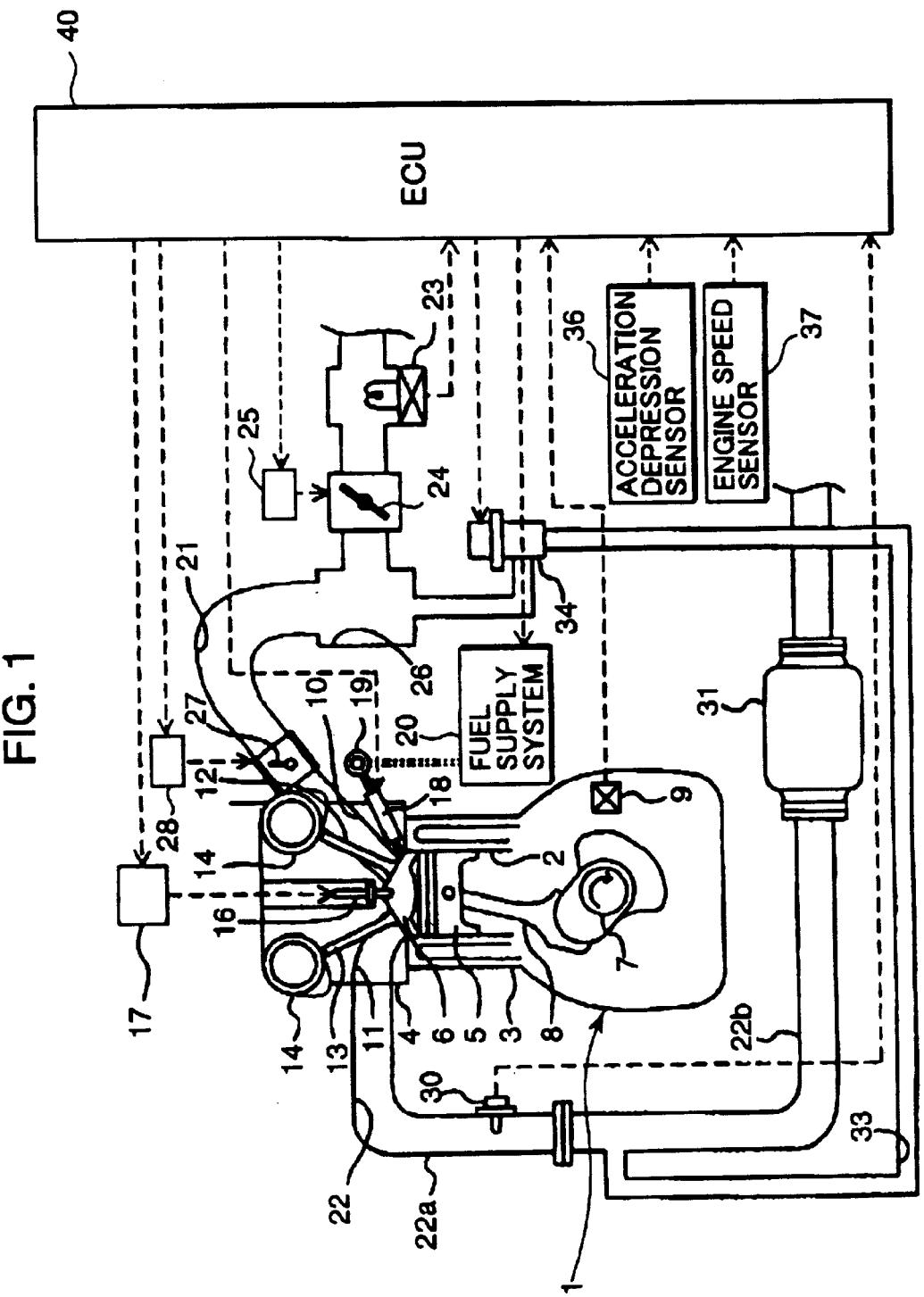
FIG. 1 is a diagram showing the overall construction of an example of a direct-injection spark-ignition engine employing a control device according to a preferred embodiment of the invention.

FIG. 1 is a diagram showing the overall construction of an example of a direct-injection spark-ignition engine employing a control device according to a preferred embodiment of the invention. Referring to the Figure, an engine body 1 has a cylinder block 3, in which a plurality of cylinders 2 are formed, and a cylinder head 4. Pistons 5 are fitted in the individual cylinders 2 in such a manner that the pistons 5 can move up and down, and a combustion chamber 6 is formed between each piston 5 and the cylinder head 4. Each piston 5 is linked to a crankshaft 7 by a connecting rod 8, the crankshaft 7 being rotatably supported at a lower part of the cylinder block 3. There is provided a crank angle sensor 9 for detecting the angle of rotation of the crankshaft 7, or the crank angle, at one end of the crankshaft 7.

The combustion chamber 6 in each cylinder 2 has a pent-roof shaped ceiling formed of two sloping surfaces extending from an upper central part of the combustion chamber 6 down to a lower end of the cylinder head 4. Two intake ports 10 open in one sloping surface of the ceiling of the combustion chamber 6 while two exhaust ports 11 open in the other sloping surface of the ceiling of the combustion chamber 6. (Note that FIG. 1 shows one each intake port 10 and exhaust port 11 only.) An intake valve 12 is provided at an open end of each intake port 10 while an exhaust valve 13 is provided at an open end of each exhaust port 11. These intake valves 12 and exhaust valves 13 are caused to open and close with specific timing individually determined for each cylinder 2 by means of a valve actuator.

A spark-plug 16 is provided at the upper central part of each combustion chamber 6, as if surrounded by the four valves 12, 13, an extreme end of the spark plug 16 extending into the combustion chamber 6 from its ceiling. The individual spark plugs 16 are connected to an ignition circuit 17 which supplies electric current to the spark plug 16 of each cylinder 2 with specific timing.

Provided at a peripheral part of each combustion chamber 6, as if sandwiched by the two intake ports 10, is a fuel injector 18 which injects fuel directly into the combustion chamber 6. Root ends of the individual injectors 18 are connected to a fuel rail 19 through which high-pressure fuel from a fuel supply system 20 is supplied to the individual cylinders 2.

Figure 2:
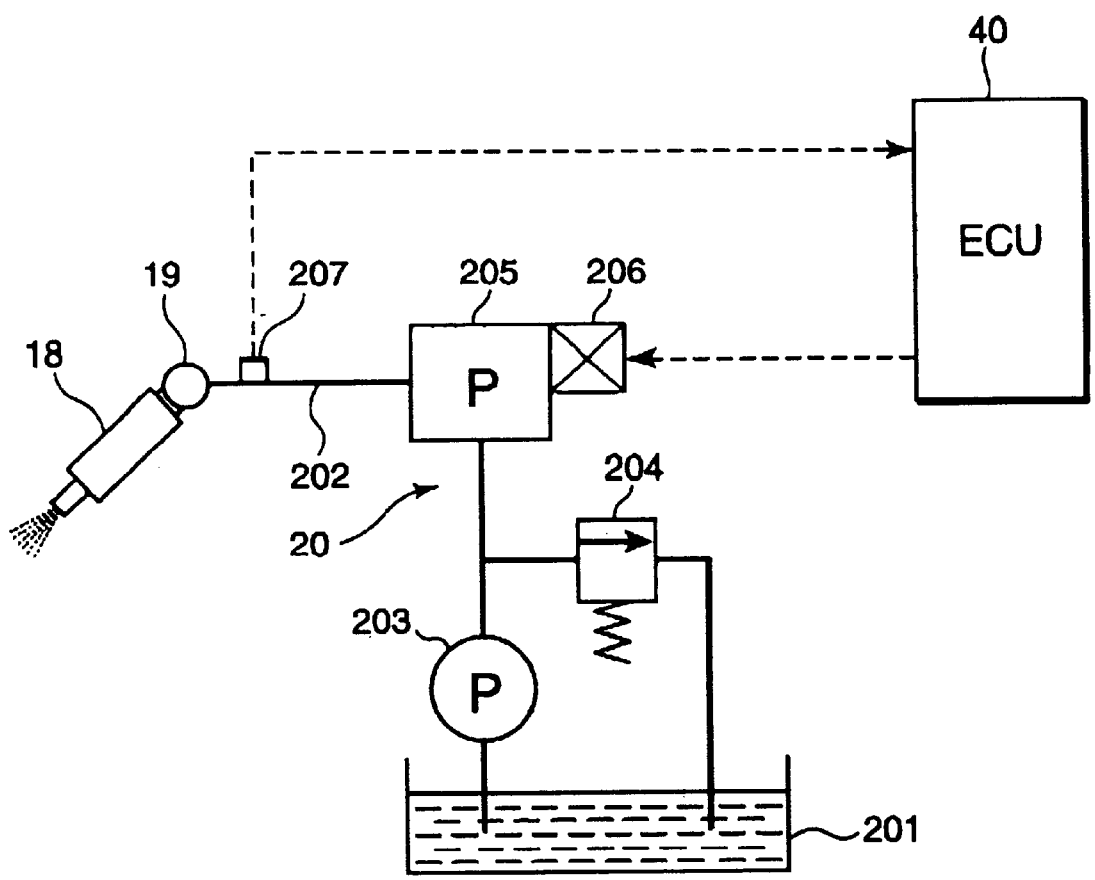
FIG. 2 is an explanatory diagram of a fuel supply system.

The fuel supply system 20 includes a fuel delivery pipe 202 interconnecting the fuel rail 19 and a fuel tank 201 as well as a low-pressure fuel pump 203, a low-pressure regulator 204, a high-pressure fuel pump 205 and so on provided along the fuel delivery pipe 202, as shown in FIG. 2, wherein detailed illustration and description are omitted. The high-pressure fuel pump 205 is provided with a solenoid valve 206 for regulating outlet pressure of the high-pressure fuel pump 205 by varying the effective length of its projecting stroke. A later-described electronic control unit (ECU) 40 controls the solenoid valve 206 to regulate fuel-outlet pressure from the high-pressure fuel pump 205 to the fuel rail 19 and thereby the pressure of the fuel sprayed from the injector 18. Designated by the numeral 207 in FIG. 2 is a fuel pressure sensor for detecting fuel pressure within a portion of the fuel delivery pipe 202 between the high-pressure fuel pump 205 and the fuel rail 19.

Figure 3:
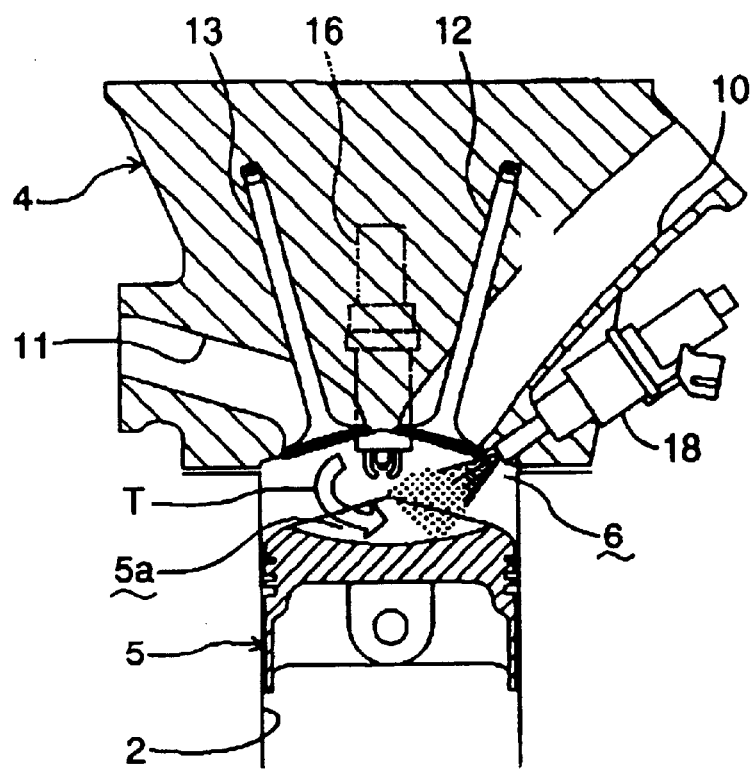
FIG. 3 is an enlarged fragmentary cross-sectional view of an engine body.

The construction of the engine body 1 is now described in further detail referring to its enlarged fragmentary cross-sectional view of FIG. 3. As depicted in the Figure, each intake port 10 extends obliquely upward generally in a straight line from the combustion chamber 6 and opens in one side surface (right side as illustrated in FIG. 3) of the engine body 1. The two intake ports 10 (of which one only is illustrated) are formed separately from each other, constituting means for creating a tumble T (tumble generator). The tumble T is formed in the combustion chamber 6 by intake air flowing through the intake ports 10 into the combustion chamber 6. As seen in the cross section of FIG. 3 where the intake ports 10 are located on the right side and the exhaust ports 11 on the left side, the tumble T flows in a counterclockwise direction as shown by an arrow.

The injector 18 is so disposed as to inject the fuel in a direction opposite to the tumble T formed in the combustion chamber 6. More specifically, as the injector 18 located on the right side sprays the fuel obliquely downward to the left as illustrated in FIG. 3, fuel spray is redirected by a top surface of the piston 5 in a direction moving against the flow of the tumble T.

Figure 4:
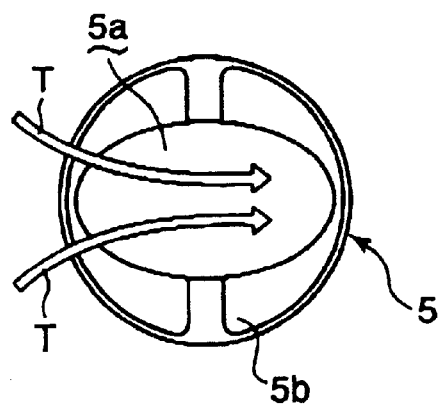
FIG. 4 is a plan view showing the top surface of a piston of the engine.

There is formed a recess 5a in the top surface of the piston 5 as depicted in FIG. 3. This recess 5a having a smoothly curving bottom extends generally equally to both sides of cylinder axis as seen in the cross section of FIG. 3. The recess 5a has a generally elliptical-shaped opening in plan view, as shown in FIG. 4, with the major axis of the elliptical opening aligned in the direction of fuel injection from the injector 18, or along the central axis of a fuel spray (left-to-right direction as illustrated in FIG. 4), and the minor axis of the elliptical opening intersecting the major axis at right angles. As the tumble T and the fuel spray are introduced into the recess 5a from opposite directions, they collide head-on with each other.

An outer portion 5b of the top surface of the piston 5, or the portion of the piston top surface excluding the recess 5a, is shaped to face generally parallel to the sloping surfaces of the ceiling of the combustion chamber 6. With this structure, a gap formed between the outer an portion 5b of the top surface of the piston 5 and the ceiling of the combustion chamber 6 serves as a squish area during a specific period before the top dead center (TDC) on every compression stroke of the piston 5, e.g., during a period from a point of 40° crank angle (CA) before the top dead center (BTDC) to the TDC.

Further, as shown in FIG. 1, an intake passage 21 connecting to the intake ports 10 of each cylinder 2 is joined to one side surface of the engine body 1 while an exhaust passage 22 connecting to the exhaust ports 11 of each cylinder 2 is joined to the other side surface of the engine body 1.

The intake passage 21 supplies intake air filtered by an air cleaner (not shown) into the combustion chamber 6 of each cylinder 2 in the engine body 1. A hot-wire type airflow sensor 23 for detecting the amount of intake air, an electrically driven throttle valve 24 which is caused to open and close by an electric motor 25 and a surge tank 26 are provided in this order along the intake passage 21 from its upstream side to downstream side. The intake passage 21 branches into independent intake air passages downstream of the surge tank 26 for the individual cylinders 2, each independent intake air passage further branching at its downstream end portion into two separate channels which are joined to the two intake ports 10.

In these two separate channels of each independent intake air passage, there is provided upstream of the two intake ports 10 one each tumble regulating valve 27 for regulating the flow velocity of the tumble T in the combustion chamber 6. The tumble regulating valve 27 is caused to open and close by an actuator 28 which is formed of a stepping motor, for example. The tumble regulating valve 27 is a circular butterfly valve, part of whose valve element (e.g., a portion of the element lower than its valve axis) is cut out. With the tumble regulating valve 27 thus structured, the intake air flows downstream through the cut-out portion of the valve element when the tumble regulating valve 27 is closed, creating a strong tumble flow in the combustion chamber 6. The intensity of this tumble flow gradually diminishes as the tumble regulating valve 27 is opened.

It is to be noted that the intake ports 10 and tumble regulating valves 27 are not limited to the aforementioned structure or shapes. As an example, the intake ports 10 may be of a so-called common port type wherein they join together at their upstream portions. In this alternative arrangement, the tumble regulating valve 27 may be structured to fit-the cross-sectional shape of the common port with part of the valve element cut away.

The exhaust passage 22 is for discharging already combusted exhaust gases from the combustion chamber 6. Provided at an upstream end portion of the exhaust passage 22 is an exhaust manifold 22a which connects to the exhaust ports 11 of the individual cylinders 2. A linear $O_2$ sensor 30 for detecting oxygen concentration in exhaust gas is provided at a joint portion of the exhaust manifold 22a. The linear $O_2$ sensor 30 is used for detecting the air-fuel ratio based on the oxygen concentration in the exhaust gas. Specifically, the engine is controlled such that its output varies linearly with the oxygen concentration within a specific range of air-fuel ratio including the stoichiometric air-fuel ratio.

An upstream end of an exhaust pipe 22b is connected to the joint portion of the exhaust manifold 22a and a catalytic converter 31 for cleaning the exhaust gas is provided downstream of the exhaust pipe 22b. Also, an upstream end of an exhaust gas recirculation (EGR) passage 33 for returning part of the exhaust gas flowing through the exhaust passage 22 back into the intake passage 21 is connected to an upstream portion of the exhaust pipe 22b. A downstream end of the EGR passage 33 is connected to the intake passage 21 just between the throttle valve 24 and the surge tank 26. An electrically-operated EGR valve 34 having an adjustable opening is provided in the EGR passage 33, whereby the amount of exhaust gas recirculated through the EGR passage 33 can be regulated.

The engine body 17, the injector 18, the fuel supply system 20, the electric motor 25 for actuating the throttle valve 24, the actuator 28 of the tumble regulating valve 27, the electrically-operated EGR valve 34, and so on, are controlled by the aforementioned ECU 40. Output signals from the crank angle sensor 9, the airflow sensor 23 and the linear $O_2$ sensor 30 are entered into the ECU 40. Sensing signals output from an accelerator depression sensor 36 for detecting the amount of depression of an accelerator pedal and an engine speed sensor 37 are also entered into the ECU 40.

Figure 5:
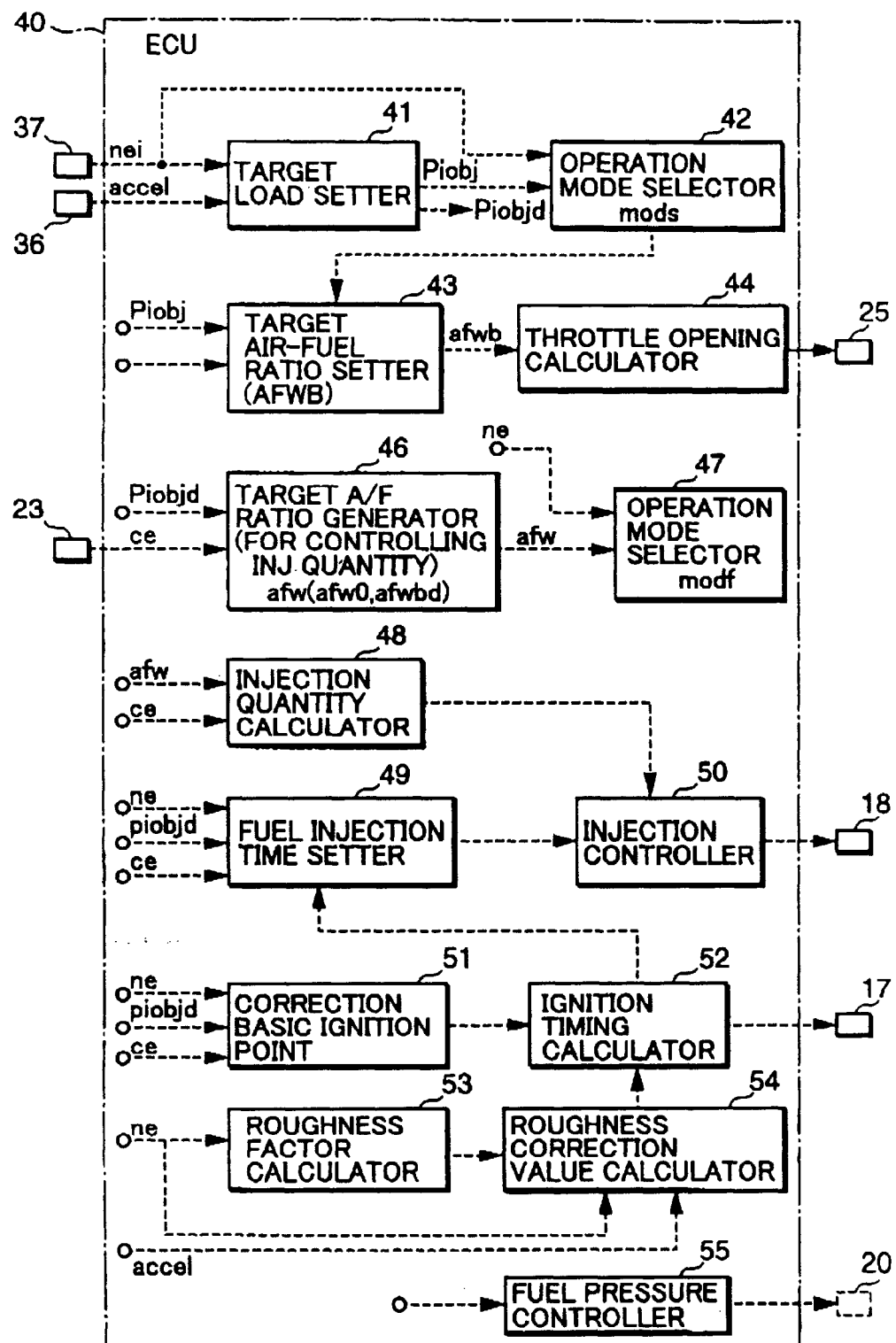
FIG. 5 is a functional block diagram of an electronic control unit of the control device according to the embodiment of the invention.

FIG. 5 is a functional block diagram of the ECU 40. As shown in the Figure, the ECU 40 has a target load setter 41 which calculates an imaginary charging efficiency corresponding to required engine torque according to accelerator depression accel and engine speed ne from maps, for example, and determines a corresponding target indicated mean effective pressure from the imaginary charging efficiency, wherein the target indicated mean effective pressure is taken as a target load.

More specifically, a first target indicated mean effective pressure Piobj is obtained from the imaginary charging efficiency by a specific mathematical treatment, while the imaginary charging efficiency is smoothed and a second target indicated mean effective pressure Piobj is obtained from the imaginary charging efficiency after smoothing process.

Figure 6:
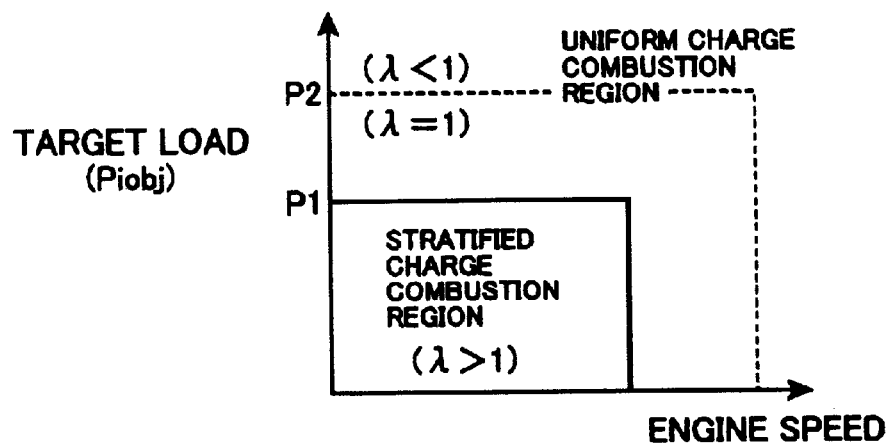
FIG. 6 is a diagram showing an example of a control map defining engine operation ranges, such as stratified and uniform charge combustion regions.

The ECU 40 also has an operation mode selector 42 which selects basic operation mode mods according to the target load (first target indicated mean effective pressure Piobj) and the engine speed ne. Specifically, the operation mode selector 42 selects stratified charge combustion mode in which stratified charge combustion is performed with the air-fuel ratio made larger than the stoichiometric air-fuel ratio (excess-air factor $\lambda>1$) in a stratified charge combustion region wherein the target load (first target indicated mean effective pressure Piobj) is smaller than a first set value P1 and the engine speed ne is lower than a set speed, whereas the operation mode selector 42 selects uniform charge combustion mode in which uniform charge combustion is performed with the air-fuel ratio made equal to or larger than the stoichiometric air-fuel ratio ($\lambda=1$) in-uniform charge combustion regions wherein the target load 11 larger than the first set value P1 and the engine speed ne is lower than the set speed, as shown in FIG. 6. Preferably, the air-fuel ratio is made equal to the stoichiometric air-fuel ratio in most of ranges among the uniform charge combustion regions, in which the target load (first target indicate mean effective pressure Piobj) is smaller than a second set value P2, and the air fuel ratio is made smaller than the stoichiometric air-fuel ratio ($\lambda<1$) in-a maximum-load (full-throttle) range, for example, in which the target load is equal to or larger than the second set value P2.

Further, the ECU 40 determines the values of various control parameters, such as the amount of intake air to be regulated by the throttle valve 24, the intensity of the tumble flow to be regulated by the tumble regulating valve 27, the amount of fuel to be injected from the injector 18 and its injection timing, and ignition point of the spark plug 16, according to the target load, the engine speed ne, and so on. To coordinate timing of controlling slow-response control parameters such as the amount of intake air and quick-response control parameters such as the amount of injected fuel, injection point and ignition point, the first target indicated mean effective pressure Piobj is used as the target load for determining the values of the slow-response control parameters while the second target indicated mean effective pressure Piobjd is used as the target load-for determining the values of the quick-response control parameters.

More particularly, the ECU 40 includes a target air-fuel ratio setter 43 and a throttle opening calculator 44 as means for controlling the amount of intake air. The target air-fuel ratio setter 43 sets a target air-fuel ratio afwb for controlling the amount of intake air according to the operation mode mods selected by the operation mode selector 42. Specifically, the target air-fuel ratio setter 43 determines the target air-fuel ratio afwb from a predefined map according to the first target indicated mean effective pressure Piobj and the engine speed ne in the stratified charge combustion mode, whereas the target air-fuel ratio setter 43 makes the target air-fuel fuel ratio afwb equal to the stoichiometric air-fuel ratio, for instance, in the uniform charge combustion regions.

The aforementioned throttle opening calculator 44 determines target charging efficiency from the imaginary charging efficiency, or the value corresponding to the target load effective when a state in which the engine is operated at the stoichiometric air-fuel ratio, and the target air-fuel ratio afwb, calculates target throttle opening based on the target charging efficiency, and outputs a corresponding control signal corresponding to the target throttle opening to the electric motor 25 for actuating the throttle valve 24.

The ECU 40 also has as means for performing control operation related to the engine's intake air system an exhaust gas recirculation (EGR) controller and a tumble controller which are not illustrated. The EGR controller controls the EGR valve 34 according to operating conditions of the engine. For example, the EGR controller-opens the EGR valve 34 to recirculate the exhaust gas in a range in which the engine is operated at the stoichiometric air-fuel ration (or in the range in which the target load is made smaller than the second set value P2) among the stratified charge combustion and uniform charge combustion regions, and the EGR controller closes the EGR valve 34 in the full-throttle range (or in the range in which the target load is equal to or larger than the second set value P2). On the other hand, the tumble controller sets the opening of the tumble regulating valve 27 based on the operation mode mods, the target load (first target indicated mean effective pressure Piobj) and the engine speed ne for regulating the intensity of this tumble flow according to the engine operating conditions.

The ECU 40 also has as means related to fuel injection from the injector 18 a target air-fuel ratio generator 46, an operation mode selector 47, and a fuel injection controller including an injection quantity calculator 48, an injection-timing setter 49 and an injection controller 50.

The target air-fuel ratio generator 46 determines a target air-fuel ratio to be used for controlling the amount of injected fuel, for example. More specifically, it calculates a target air-fuel ratio afw0 to be used in a transient operating state of the engine as well as a target air-fuel ratio afwbd to be used in normal operating conditions, and determines a final target air-fuel ratio afw after selecting the target air-fuel ratio afw0 or afwbd.

The target air-fuel ratio afw0 to be used in the transient operating state is calculated based on actual charging efficiency ce and the second target indicated mean effective pressure Piobjd such that engine torque corresponding to the target load is obtained at the actual charging efficiency ce which is derived from the output from the airflow sensor 23. On the other hand, the target air-fuel ratio afwbd to be used in the normal operating conditions is obtained from a predefined map according to the second target indicated mean effective pressure Piobjd and the engine speed ne in the stratified charge combustion mode, while it is made equal to the stoichiometric air-fuel ratio, for instance, in the uniform charge combustion mode.

In the transient operating state in which the difference between the target air-fuel ratio afwb for controlling the amount of intake air and the target air-fuel ratio afw0 increases, the aforementioned target air-fuel ratio afw0 is used as the final target air-fuel ratio afw, while in the normal operating conditions in which the difference between the target air-fuel ratio afwb and the target air-fuel ratio afw0 is small, the aforementioned target air-fuel ratio afwbd is used as the final target air-fuel ratio afw.

The-operation mode selector 47 selects operation mode modf to be used for determining the quick-response control parameters based on the target air-fuel ratio afw. Specifically, it selects the uniform charge combustion mode for determining the quick-response control parameters when the target air-fuel ratio afw0 is equal to or larger than a specific value and the uniform charge combustion mode when the target air-fuel ratio afw0 is smaller than the same value. While the operation mode modf selected by the operation mode selector 47 for high-speed operation and the basic operation mode mods (for low-speed operation) selected by the operation mode selector 42 are the same in principle, they could occasionally be different in the transient operating state of the engine when its operation mode is switched.

The injection quantity calculator 48 calculates a basic fuel injection quantity based on the actual charging efficiency ce derived from the output from the airflow sensor 23 and the target air-fuel ratio afw determined by the target air-fuel ratio generator 46. The infection quantity calculator 48 further calculates a final fuel injection quantity taking into account various correction values (e.g., a feedback correction value determined based on a comparison between a value detected by the linear $O_2$ sensor 30 and the target air-fuel ratio), and determines an injection pulse length which is proportional to the final fuel injection quantity.

Figure 7:
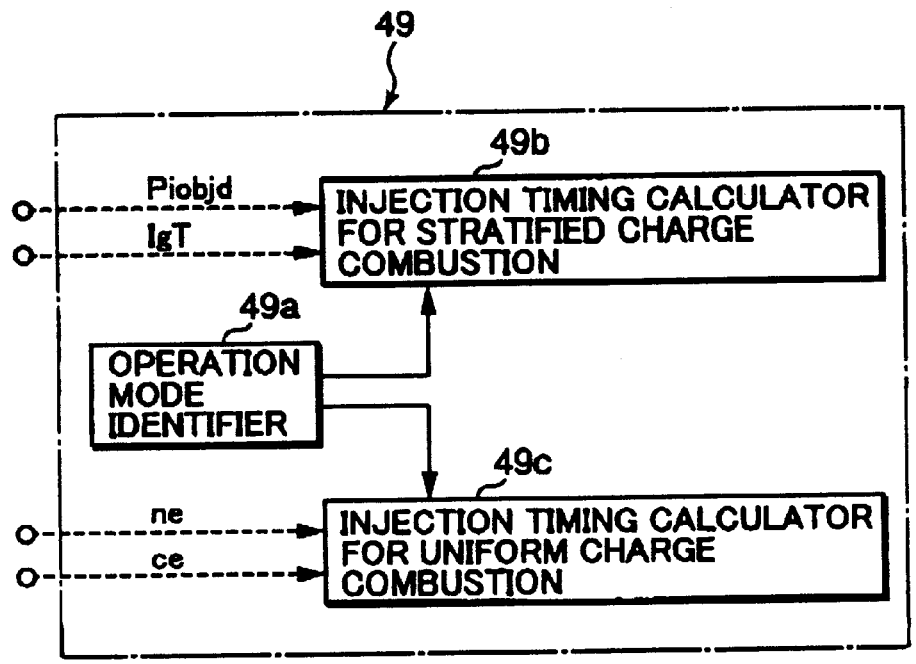
FIG. 7 is a block diagram showing the specific configuration of an injection timing setter shown in FIG. 5.

The injection timing setter 49 sets a fuel injection time according to the operation mode and engine operating conditions, for example. It includes an operation mode identifier 49a for identifying the operation mode modf for high-speed operation selected by the operation mode selector 47 and injection timing calculators 49b and 49c for calculating the fuel injection time for stratified charge combustion and uniform charge combustion, respectively, according to a decision made by the operation mode identifier 49a, as shown in FIG. 7.

The stratified charge combustion injection timing calculator 49b calculates the difference in crank angle between the ending point of fuel injection and ignition point such that the fuel injection time falls within compression stroke to perform stratified charge combustion and, in particular, according to the target load (second target indicated mean effective pressure Piobjd) as will be discussed later. The stratified charge combustion injection timing calculator 49b then calculates the fuel injection time based on the difference in crank angle thus obtained and ignition point IgT calculated by a later-described ignition timing calculator 52. The uniform charge combustion injection timing calculator 49c determines the fuel injection time from a map according to the actual charging efficiency ce and the engine speed ne such that the fuel injection time falls within intake stroke to perform uniform charge combustion.

The aforementioned injection controller 50 outputs an injection pulse of which duration is equal to the fuel injection time set by the injection timing setter 49 such that the injector 18 is actuated during a period of time corresponding to the injection pulse length calculated by the injection quantity calculator 48.

The ECU 40 has as means for controlling the ignition point a setter 51 for setting a basic ignition point and its correction values and the aforementioned ignition timing calculator 52. The means for controlling the ignition point of this embodiment further includes a roughness factor calculator 53 and a roughness correction value calculator 54 used for correcting the ignition point according to road roughness.

The aforementioned setter 51 sets the basic ignition point, etc. according to the operation mode modf selected by the operation mode selector 47. Specifically, it determines the basic ignition point from a map according to the target load (second target indicated mean effective pressure Piobjd) and the engine speed ne in the stratified charge combustion mode, while it determines the basic ignition point from the map according to the actual charging efficiency ce and the engine speed ne in the uniform charge combustion mode. It also determines various correction values according to the cooling water temperature and other parameters. The basic ignition point thus obtained is set such that it is progressively retarded (or it approaches the top dead center on the compression stroke) within a range not exceeding the compression stroke top dead center with an increase in the target load.

The roughness factor calculator 53 detects cycle-by-cycle variations of combustion by monitoring engine speed variations and calculates a roughness factor indicating the degree of cycle-by-cycle combustion variations, while the roughness correction value calculator 544 calculates an ignition point correction value corresponding to the roughness factor.

Also, the ignition timing calculator 52 determines a final ignition point from the aforementioned basic ignition point and various correction values as well as the correction value corresponding to the roughness factor and outputs a corresponding signal for controlling the ignition point eventually determined by the engine body 17.

Designated by the numeral 55 in FIG. 5 is a fuel pressure controller which increases the fuel pressure to a level higher than the pressure in the combustion chamber 6 on the compression stroke in the stratified charge combustion region and controls the fuel pressure according to the engine operating conditions to regulate fuel spray penetration for balancing it with tumble flow. For example, since the tumble flow intensifies as the engine speed increases, the fuel pressure controller 55 increases the fuel pressure with an increase in the engine speed to correspondingly intensify the fuel spray penetration. This is achieved by calculating a target fuel pressure according to the engine speed using a table, for example, and outputting a control signal to the solenoid valve 206 of the high-pressure fuel pump 205 of the fuel supply system 20 in accordance with the difference between the target fuel pressure and the fuel pressure detected by the fuel pressure sensor 207.

Figure 8:
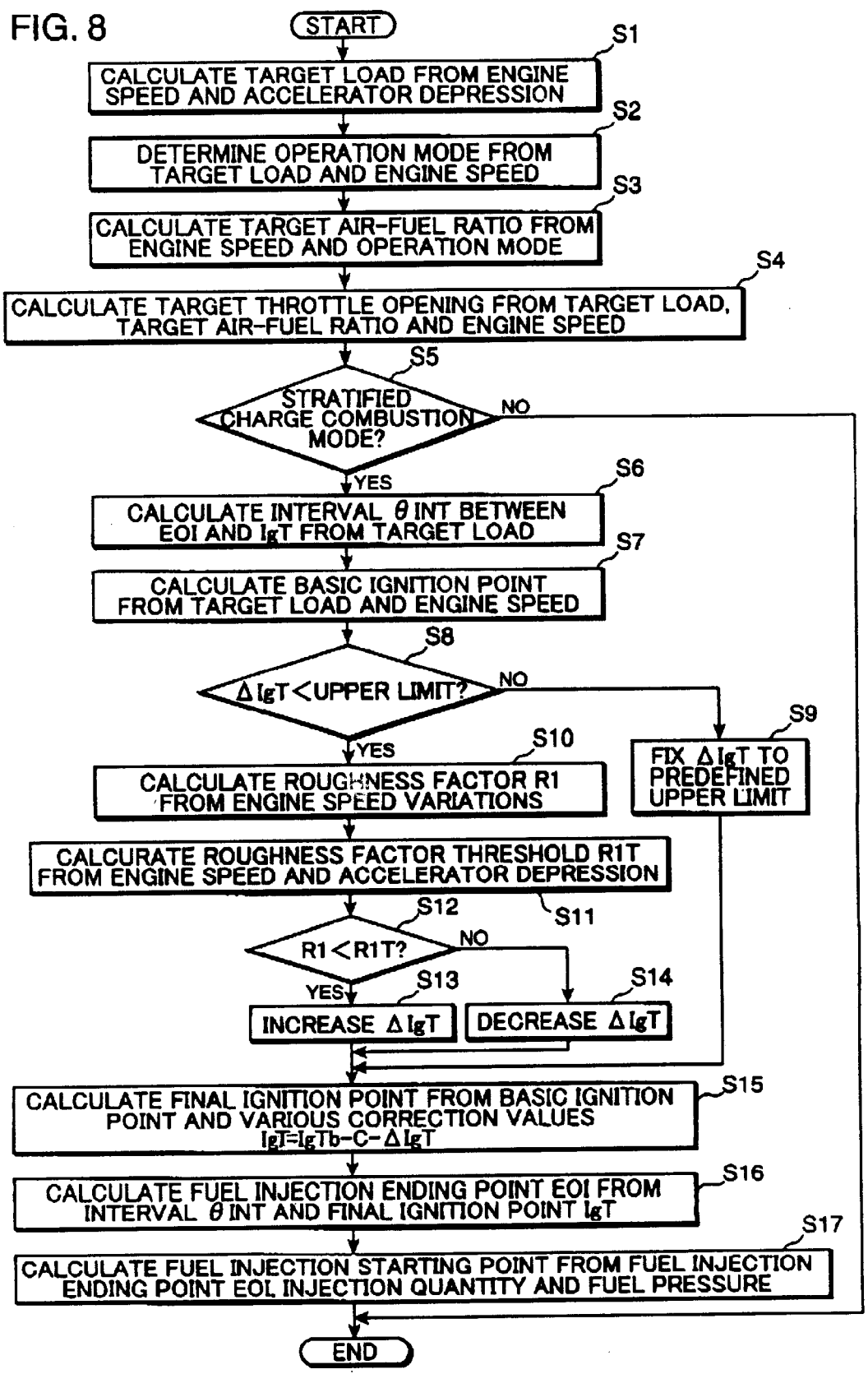
FIG. 8 is a flowchart showing operations performed by the engine of the embodiment for controlling the amount of intake air, fuel injection point and ignition point.

FIG. 8 is a flowchart showing a sequence of operations performed by the ECU 40 for controlling the amount of intake air, fuel injection time and ignition point.

Upon starting the operational sequence of FIG. 8, the target load setter 41 of the ECU 40 calculates a target load (Piobj) from the engine speed ne and the accelerator depression accel in step S1, and the operation mode selector 42 determines the operation mode mods based on the target load and the engine speed ne in step S2. Then, the target air-fuel ratio setter 43 calculates the target air-fuel ratio afwb based on the engine speed ne and the operation mode mods in step S3, and the throttle opening calculator 44 calculates the target throttle opening based on the target load, the target air-fuel ratio afwb, the engine speed ne, etc. in step S4.

Then, the injection timing setter 49 and the individual elements 51–54 of the means for controlling the ignition point perform their functions in steps S5 to S17. Specifically, a judgment is made in step S5 to determine whether to select the stratified charge combustion mode or not. Preferably, this judgment is made by checking the operation mode modf selected by the operation mode selector 47 and judging whether this operation mode modf is the stratified charge combustion mode. If it is the stratified charge combustion mode, interval θINT in terms of the crank angle between the fuel injection ending point EOI and the ignition point IgT is calculated in step S6.

Figure 9A:
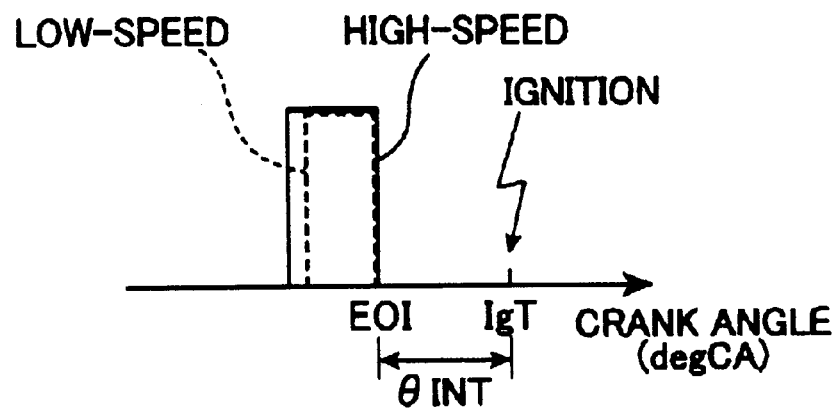
FIGS. 9A and 9B are diagrams showing how crank angle interval and time interval between the fuel injection ending point and ignition point vary throughout low-speed and high-speed ranges within the stratified charge combustion region.
Figure 9B:
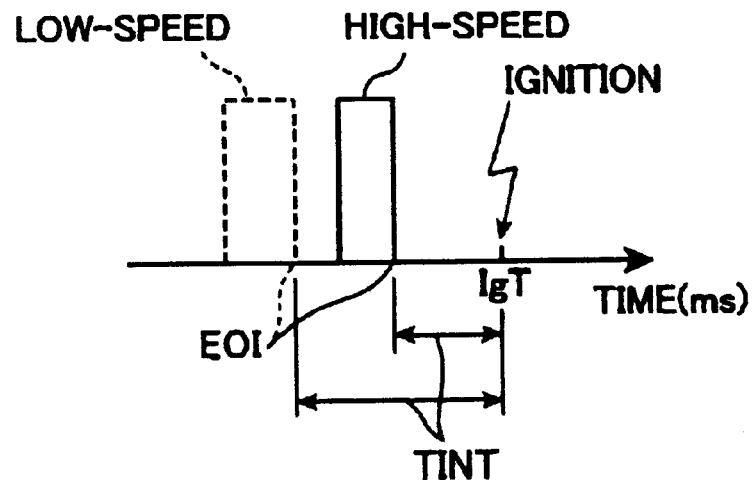
Figure 10A:
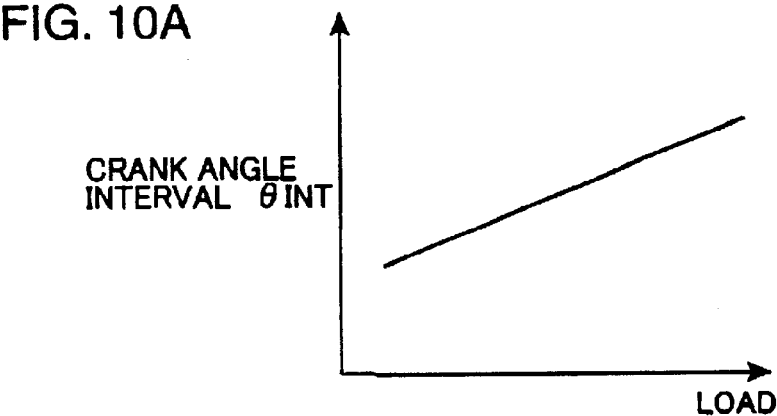
FIGS. 10A and 10B are diagrams showing how the crank angle interval and time interval between the fuel injection ending point and ignition point vary in relation to engine load.
Figure 10B:
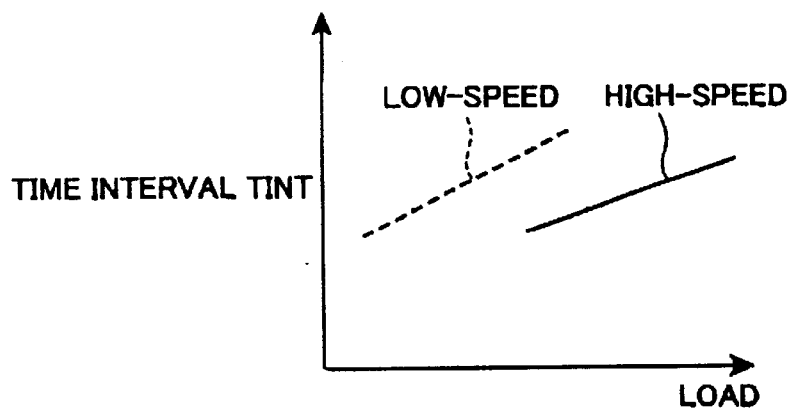

In this embodiment, the aforementioned interval θINT is kept unchanged throughout low-speed and high-speed ranges within the stratified charge combustion region as shown in FIG. 9A if the load is same. In other words, the interval θINT is held constant regardless of variations in the engine speed ne. With respect to load variations, on the other hand, the interval θINT in terms of the crank angle is increased with an increase in the load as shown in FIG. 10A. Consequently, time interval TINT between the fuel injection ending point EOI and the ignition point IgT is made shorter with an increase in the engine speed ne and made longer with an increase in the load within the stratified charge combustion region as shown in FIGS. 9B and 10B.

Data indicating the aforementioned relationship between the load and interval θINT is stored in a memory of the ECU 40 in the form of a table, for example, and the interval θINT is calculated based on the target load from the table in step S6.

Subsequently, a basic ignition point is calculated according to the target load and the engine speed ne in step S7, and a judgment is made in step S8 to determine whether ignition point correction value ΔIgT corresponding to road roughness is smaller than a predefined upper limit or not. This upper limit of the ignition point correction value ΔIgT is a "limiter" for avoiding its excessive variations potentially caused by errors in detecting the road roughness, for example. If the correction value ΔIgT is judged to be equal to or larger than the upper limit, the correction value ΔIgT is fixed to the upper limit in step S9 and the operation flow proceeds to step S15.

If the judgment result in step S8 is in the affirmative, roughness factor R1 indicating the degree of cycle-by-cycle combustion variations is calculated from engine speed variations in step S10, and roughness factor threshold R1T corresponding to a permissible roughness level is calculated from the engine speed ne and the accelerator depression accel in step S11. Then, the roughness factor R1 is compared with the roughness factor threshold R1T in step S12. If the roughness factor R1 is smaller than the roughness factor threshold R1T, the correction value ΔIgT for retarding the ignition point IgT is increased in step S13. If the roughness factor R1 is equal to or larger than the roughness factor threshold R1T, the correction value ΔIgT for retarding the ignition point IgT is decreased in step S14.

Further, in step S15, final ignition point IgT is calculated from the basic ignition point IgTb, the ignition point correction value ΔIgT corresponding to the road roughness and various other correction values C.

Then, the fuel injection ending point EOI is calculated from the interval θINT in terms of the crank angle and the final ignition point IgT in step S16. Consequently, the fuel injection ending point EOI is set to a point the crank angle corresponding to the interval θINT before the final ignition point IgT in step S16.

A fuel injection starting point is calculated from the fuel injection ending point EOI, fuel injection quantity and fuel pressure in step S17.

While there is provided no illustration of a case where the operation mode modf is judged to be other than the stratified charge combustion mode (e.g., the uniform charge combustion mode), the ignition point and the fuel injection time in the uniform charge combustion mode is determined according to the engine speed ne, the actual charging efficiency ce, etc. as previously described.

According to the above-described engine control device of the present embodiment, the injector 18 injects the fuel in the compression stroke and a tumble flow is created in the combustion chamber 6, the fuel being sprayed in a direction opposite to the tumble flow, in the stratified charge combustion region. As a consequence, the tumble flow and fuel spray collide with each other in the combustion chamber 6, accelerating atomization of the fuel and creating a combustible mixture around the spark plug 16 at the ignition point, and eventually causing stratified charge combustion.

In particular, the stratified charge combustion is performed in a preferable fashion in stratified charge combustion regions over wide engine speed ranges from low-speed to high-speed ranges, resulting in an improvement in fuel economy. This is because the fuel pressure is regulated by the fuel pressure controller 55 according to the engine operating conditions to maintain a balance between the intensity of the tumble flow and the fuel spray penetration and the interval θINT between the fuel injection ending point EOI and the ignition point IgT is adjusted as shown in FIGS. 9A–9B and 10A–10B in the aforementioned operations (steps S6 and S16 of FIG. 8) performed by the stratified charge combustion injection timing calculator 49b of the injection timing setter 49.

More specifically, in the low engine speed range within the stratified charge combustion regions, the fuel pressure is regulated such that the tumble flow becomes relatively weak and the fuel spray penetration also becomes relatively small correspondingly, achieving a state of good balance between themselves, and the interval θINT between the fuel injection ending point EOI and the ignition point IgT is adjusted such that the fuel is sufficiently vaporized and atomized during a period from fuel injection to ignition and a state in which a mixture of an appropriate fuel concentration is locally distributed around the spark plug 16 is obtained at the ignition point IgT under such conditions where the tumble flow is weak and the fuel spray penetration is small.

In the high engine speed range within the stratified charge combustion regions, on the other hand, the tumble flow becomes more forceful than in the low engine speed range. Nevertheless, since the fuel pressure is increased correspondingly, the fuel spray penetration is enhanced and, therefore, a balance is maintained between the intensity of the tumble flow and the fuel spray penetration. Although the fuel spray becomes more likely to be dispersed due to collision with the intensified tumble flow while evaporation and atomization of the fuel are accelerated under these conditions, dispersion of the fuel is suppressed as the time interval TINT between the fuel injection ending point EOI and the ignition point IgT is shortened. Since the interval θINT in terms of the crank angle between the fuel injection ending point EOI and the ignition point IgT is kept unchanged in this embodiment, the time interval TINT is shortened in inverse proportion to an increase in the engine speed ne and an adequate effect of preventing fuel dispersion is obtained.

Although the fuel becomes more likely to be dispersed as the intensity of the tumble flow and the fuel spray penetration increase with an increase in the engine speed ne, this tendency is compensated for by adjusting the time interval TINT between the fuel injection ending point EOI and the ignition point IgT in the aforementioned manner, making it possible to obtain a good stratified charge combustion state even in the high engine speed range within the stratified charge combustion regions.

With respect to engine load variations, the aforementioned crank angle interval θINT is increased with an increase in the engine load and, because the crank angle interval θINT is proportional to the time interval TINT at the same engine speed, the time interval TINT increases as the engine load increases. As a result, the tendency toward excessive concentration of the fuel around the spark plug 16 with an increase in the amount of injected fuel due to the increase in the engine load is compensated for, making it possible to obtain a proper stratified charge combustion state in a high engine load range within the stratified charge combustion regions as well.

If the fuel injection starting point is too advanced, there can arise a problem that the tumble flow and the fuel spray do not collide with each other in a preferable fashion, for example. It is however possible to achieve good stratification of the fuel by increasing the aforementioned crank angle interval θINT while preventing excessive advancing of the fuel injection starting point in the high engine load range within the stratified charge combustion regions if the ignition point is retarded (or caused to approach the compression stroke top dead center) as the engine load increases.

Furthermore, because the fuel injection ending point (as well as the fuel injection starting point) is calculated based on the ignition point IgT obtained from the target load, the engine speed ne, etc. and the crank angle interval θINT which remains unchanged regardless of changes in the engine speed ne according to the fuel injection timing setting method shown in FIG. 8, it is not necessary to predefine fuel injection timing for individual engine operating conditions in a map and to simplify operations for controlling the fuel injection timing. Moreover, since the fuel injection ending point is calculated from the ignition point IgT and the crank angle interval θINT, the time interval TINT is properly adjusted to ensure a good stratified charge combustion state even when the ignition point IgT is altered according to the engine operating conditions.

In particular, since the ignition point is corrected (retarded) in a direction advantageous for the fuel economy within a range in which the roughness does not exceed a permissible level and the fuel injection ending point is calculated based on this ignition point and the crank angle interval θINT in this embodiment, both the ignition point and the fuel injection timing are so adjusted that they become optimum for the fuel economy.

Specifically, when the engine is run in the stratified charge combustion mode with the injector 18 injecting the fuel in the compression stroke, the fuel is burnt slowly so that a desired ignition point lies close to the top dead center.

Figure 11:
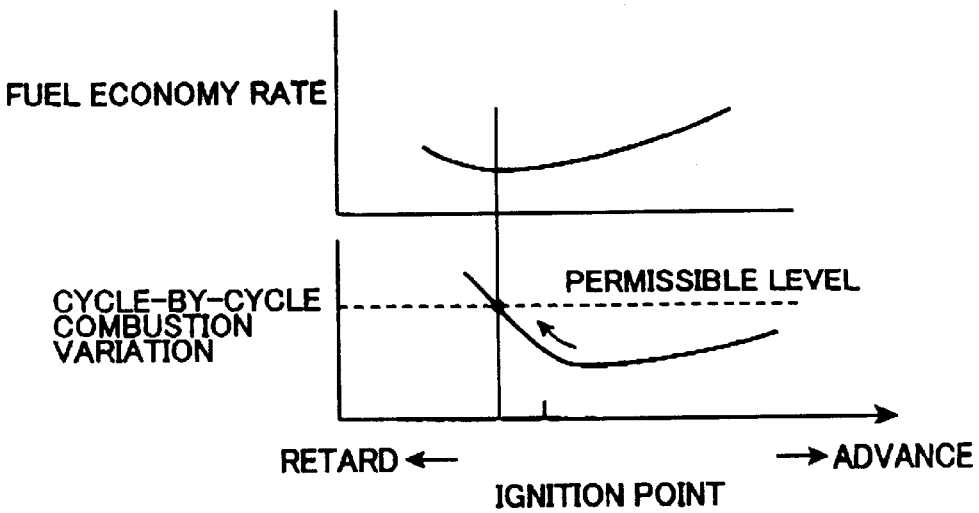
FIG. 11 is a diagram showing how fuel economy rate and cycle-by-cycle combustion variations vary in relation to the ignition point during stratified charge combustion.

Therefore, if the ignition point is advanced in this condition, pre-combustion occurs, causing counter-torque. If the ignition point and the fuel injection timing are too much retarded, the tumble flow diminishes so that the fuel spray would move generally in a horizontal direction without ascending, causing a deterioration in combustion stability. Consequently, as the ignition point is retarded, a point of minimum fuel economy rate is reached at an ignition point setting where cycle-by-cycle combustion variations reach a permissible level as shown in FIG. 11. This means that it is possible to maintain a state of good fuel economy by setting the ignition point at a point where the cycle-by-cycle combustion variations almost reach the permissible level and controlling the fuel injection timing accordingly.

It should be noted that the invention is not limited to the control device and method of the aforementioned embodiment, but various changes and modifications are possible thereto within the scope of the invention.

For example, although the crank angle interval θINT between the fuel injection ending point EOI and the ignition point IgT is maintained constant regardless of changes in the engine speed within the stratified charge combustion regions if the load is same in the foregoing embodiment, the crank angle interval θINT may be kept generally constant or reduced with an increase in the engine speed. What is important in the light of this invention is that the aforementioned time interval TINT be shortened to such an extent that the tendency of the fuel to easily disperse as the intensity of the tumble flow and the fuel spray penetration increase with an increase in the engine speed be compensated for.

Furthermore, the fuel spray penetration may be controlled by varying the angle of fuel spray from the spark plug 16 according to the engine speed, etc. instead of regulating the fuel pressure as described in this foregoing embodiment.

In summary, a control device of the invention for a direct-injection spark-ignition engine having a tumble generator for creating a tumble in a combustion chamber and a fuel injector which injects fuel into the combustion chamber in a direction opposite to tumble flow such that a combustible mixture is produced around a spark plug at an ignition point in a stratified charge combustion region which is a low-speed low-load operating range of the engine comprises a penetration adjuster for regulating penetration of a fuel spray from the injector in such a manner that it is progressively intensified with an increase in engine speed in the stratified charge combustion region, and a fuel injection controller for controlling fuel injection timing of the injector according to engine operating conditions, wherein the fuel injection controller causes the injector to inject the fuel before the ignition point on compression stroke in the stratified charge combustion region and controls the injection timing such that the interval between a fuel injection ending point and the ignition point becomes shorter with an increase in the engine speed under the same engine load within the stratified charge combustion region.

According to this construction, the fuel injection timing is controlled in relation to the ignition point and the fuel is injected in a direction opposite to the tumble flow in the stratified charge combustion region, so that a combustible mixture is produced around the spark plug at the ignition point, causing stratified charge combustion.

In particular, while the tumble flow intensifies as the engine speed increases, the penetration of the fuel spray from the injector is also intensified correspondingly so that the intensity of the tumble flow and the fuel spray penetration are held in a well-balanced state. Furthermore, although the fuel tends to be dispersed in higher engine speed ranges in the stratified charge combustion region as a result of an increase in hydraulic impact energy caused by the intensified tumble flow and fuel spray penetration, this tendency is compensated for as a reduction in time interval between the fuel injection ending point and the ignition point serves to suppress dispersion of the fuel. These effects of the invention make it possible to maintain a good stratified charge combustion state over wide engine speed ranges from low-speed to high-speed ranges in the stratified charge combustion region.

In one aspect of the invention, the fuel injection controller controls the injection timing such that the interval in crank angle between the fuel injection ending point and the ignition point remains generally the same at high engine speed and low engine speed or becomes shorter at high engine speed than at low engine speed in the stratified charge combustion region. Although the fuel tends to be dispersed at higher engine speeds due to the progressively intensified tumble flow and fuel spray penetration, this arrangement produces an effect of suppressing dispersion of the fuel which is sufficient to overcome this tendency.

Preferably, the fuel injection controller should control the injection timing in such a way that the interval in crank angle between the fuel injection ending point and the ignition point becomes progressively longer with an increase in engine load in the stratified charge combustion region. This arrangement serves to compensate for the tendency toward excessive concentration of the fuel around the spark plug when the amount of injected fuel increases due to an increase in engine load in the stratified charge combustion region, making it possible to obtain a proper stratified charge combustion state in a high engine load range within the stratified charge combustion region as well.

The fuel injection controller may be of a type which regulates the pressure of the fuel supplied to the injector, for example.

Preferably, the fuel injection controller should control the injection timing in such a way that the interval in crank angle between the fuel injection ending point and the ignition point becomes progressively longer with an increase in engine load in the stratified charge combustion region. This arrangement serves to compensate for the tendency toward excessive concentration of the fuel around the spark plug when the amount of injected fuel increases due to an increase in engine load in the stratified charge combustion region, making it possible to obtain a proper stratified charge combustion state in a high engine load range within the stratified charge combustion region as well.

According to the invention, a method of setting fuel injection timing of a direct-injection spark-ignition engine having a tumble generator for creating a tumble in a combustion chamber and a fuel injector which injects fuel into the combustion chamber in a direction opposite to tumble flow such that a combustible mixture is produced around a spark plug at an ignition point in a stratified charge combustion region which is a low-speed low-load operating range of the engine comprises the steps of calculating target load according to the amount of depression of an accelerator pedal and engine speed, determining the ignition point according to the target load and the engine speed in the stratified charge combustion region, and setting as a fuel injection ending point a point generally fixed crank angle before the ignition point regardless of variations in the engine speed.

This method makes it possible to easily and accurately set the fuel injection ending point for maintaining good stratification of the fuel over wide engine speed ranges from low-speed to high-speed ranges in the stratified charge combustion region.

In setting the fuel injection ending point in relation to the ignition point by this method, it is preferable to progressively advance the fuel injection ending point with an increase in the target load.

This application is based on Japanese Patent Application Serial No. 2001-147020 filed in Japan Patent Office on May 16, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control device for a direct-injection spark-ignition engine having a tumble generator for creating a tumble in a combustion chamber and a fuel injector which injects fuel into the combustion chamber in a direction opposite to tumble flow such that a combustible mixture is produced around a spark plug at an ignition point in a stratified charge combustion region which is a low-speed low-load operating range of the engine, said control device comprising:

a penetration adjuster for regulating penetration of a fuel spray from the injector in such a manner that it is progressively intensified with an increase in engine speed in the stratified charge combustion region; and a fuel injection controller for controlling fuel injection timing of the injector according to engine operating conditions:

wherein the fuel injection controller causes the injector to inject the fuel before the ignition point on compression stroke in the stratified charge combustion region and controls the injection timing such that the interval between a fuel injection ending point and the ignition point becomes shorter with an increase in the engine speed under the same engine load within the stratified charge combustion region.

2. The control device for a direct-injection spark-ignition engine according to claim 1, wherein the fuel injection controller controls the injection timing such that the interval in crank angle between the fuel injection ending point and the ignition point remains generally the same at high engine speed and low engine speed or becomes shorter at high engine speed than at low engine speed in the stratified charge combustion region.

3. The control device for a direct-injection spark-ignition engine according to claim 1, wherein the fuel injection controller controls the injection timing such that the interval in crank angle between the fuel injection ending point and the ignition point becomes progressively longer with an increase in the engine load in the stratified charge combustion region.

4. The control device for a direct-injection spark-ignition engine according to claim 1, wherein the fuel injection controller regulates the pressure of the fuel supplied to the injector.

5. The control device for a direct-injection spark-ignition engine according to claim 1, wherein the ignition point is progressively retarded with an increase in the engine load.

6. A method of setting fuel injection timing of a direct-injection spark-ignition engine having a tumble generator for creating a tumble in a combustion chamber and a fuel injector which injects fuel into the combustion chamber in a direction opposite to tumble flow such that a combustible mixture is produced around a spark plug at an ignition point in a stratified charge combustion region which is a low-speed low-load operating range of the engine, said method comprising the steps of:

calculating target load according to the amount of depression of an accelerator pedal and engine speed;

determining the ignition point according to the target load and the engine speed in the stratified charge combustion region; and setting as a fuel injection ending point a point generally fixed crank angle before the ignition point regardless of variations in the engine speed.

7. The method of setting fuel injection timing of a direct-injection spark-ignition engine according to claim 6, wherein, in setting the fuel injection ending point in relation to the ignition point, the fuel injection ending point is progressively advanced with an increase in the target load.

8. A control device for a direct-injection spark-ignition engine having an intake port formed to create a tumble in a combustion chamber, a spark plug located at an upper central part of the combustion chamber, a fuel injector which is located at a peripheral part of the combustion chamber and injects fuel into the combustion chamber in a direction opposite to tumble flow such that a combustible mixture is produced around the spark plug at an ignition point in a stratified charge combustion region which is a low-speed low-load operating range of the engine, said control device comprising:

a high-pressure fuel pump capable of regulating fuel pressure applied to the injector;

an engine speed sensor for detecting engine speed;

an accelerator depression sensor for detecting the amount of depression of an accelerator pedal;

an airflow sensor for detecting the amount of intake air; and an engine control unit which detects engine operating conditions based on outputs from the engine speed sensor and the accelerator depression sensor and, based on the detected engine operating conditions and an output from the airflow sensor, controls the fuel pressure such that a fuel spray from the injector is progressively intensified with an increase in the engine speed in the stratified charge combustion region, causes the injector to inject the fuel before the ignition point on compression stroke in the stratified charge combustion region, and controls the ignition point and fuel injection timing such that and the interval between a fuel injection ending point and the ignition point becomes shorter with an increase in the engine speed under the same engine load within the stratified charge combustion region.

9. The control device for a direct-injection spark-ignition engine according to claim 8, wherein the engine control unit controls the injection timing such that the interval in crank angle between the fuel injection ending point and the ignition point remains generally the same at high engine speed and low engine speed or becomes shorter at high engine speed than at low engine speed in the stratified charge combustion region.

10. The control device for a direct-injection spark-ignition engine according to claim 8, wherein the engine control unit progressively retards the ignition point with an increase in the engine load and controls the injection timing such that the interval in crank angle between the fuel injection ending point and the ignition point becomes progressively longer with an increase in the engine load in the stratified charge combustion region.

* * * * *